T. & G. W. ROBINSON.
Bee-Hives.
No. 155,109. Patented Sept. 15, 1874.
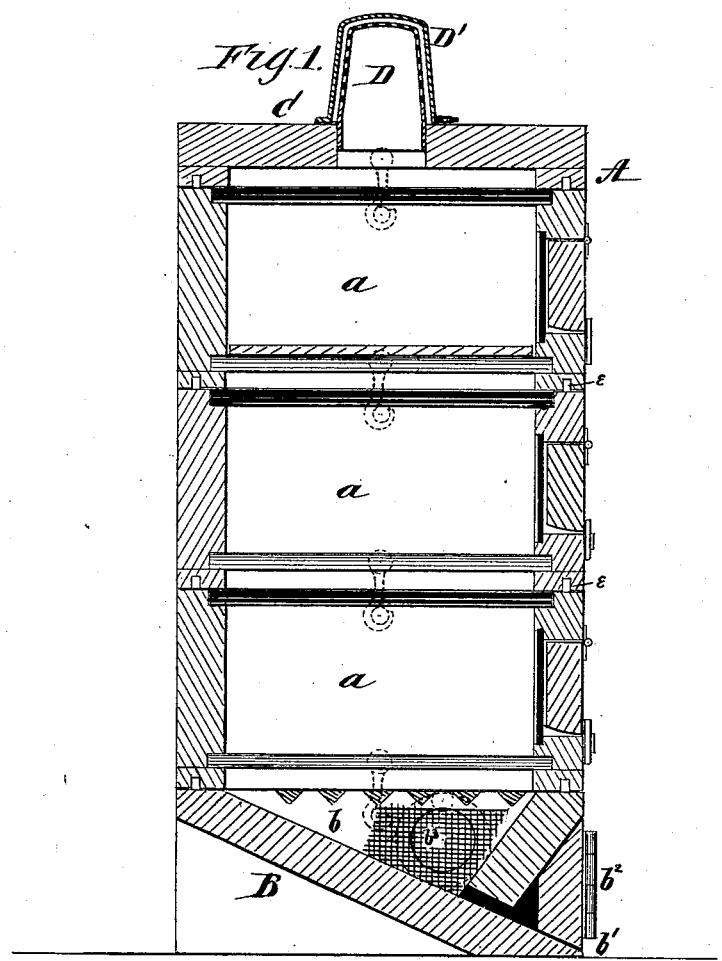
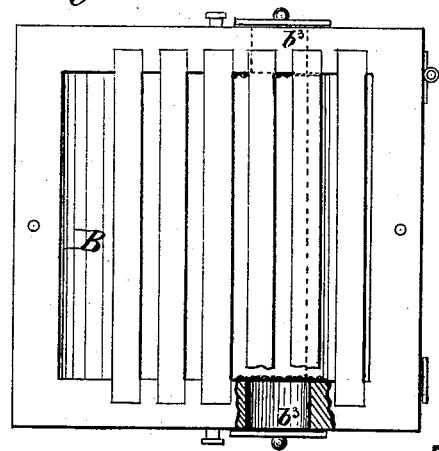

UNITED STATES PATENT OFFICE.

THOMAS ROBINSON AND GEORGE W. ROBINSON, OF LUMBERPORT, W. VA.

IMPROVEMENT IN BEE-HIVES.

Specification forming part of Letters Patent No. 155,109, dated September 15, 1874; application filed July 24, 1874.

*To all whom it may concern:*

Be it known that we, THOMAS ROBINSON and GEORGE W. ROBINSON, of Lumberport, in the county of Harrison and State of West Virginia, have invented a new and Improved Bee-Hive; and we do hereby declare that the following is a full, clear, and exact description of the same, reference being had to the accompanying drawing forming a part of this specification, in which—

Figure 1 is a sectional elevation, and Fig. 2 a horizontal section, of hive.

The invention relates to bee-hives that are made in two or more sections resting upon a common base, and placed one above another; and it consists in the improvement thereof, as hereinafter fully described, and pointed out in the claims.

A represents the hive, made in three similar sections, $a$, each slatted both at top and bottom, so that they will be entirely independent of each other, and so that the comb may be fastened to them alone at top and bottom, thus enabling us to dispense altogether with honey-frames, and to place the bottom section on top. B is the base, slatted on top, having the inclined passage $b$, entrance $b^1$, door $b^2$, and ventilations $b^3$ $b^3$. The latter are provided with pivoted covers, by which they may be closed when the door is open, if desired. C is the cover of our hive, having the reticulated cup-ventilator D on top. This is supplemented by a close cap, D′, that fits thereover, so that, when closed, the vapor will be condensed on the inside, and flow out at the bottom. This will not be stopped up, as those in the sides usually are, by the bees themselves, but will take off the unhealthy exhalations from the bees, keeping everything in the hive dry, sweet, and healthy. Each section may be held temporarily to the others by means of studs E in the subjacent one, and corresponding holes in the superposed one.

In a hive of this construction, the objects and advantages are, that the lower section, in which the bees feed, may be taken out and placed on top after it becomes empty, thus becoming the section which is robbed and used on the succeeding year. In this way the same comb is never filled with honey but twice, and the generation of disease is prevented. In robbing, the top is simply lifted off, and the first section is removed, the bees having made no junction of the slats of two adjoining sections, but having simply fastened the combs to the top and bottom slats of each section.

In sectional hives it is customary to cut or tear the connected combs of two sections, which is very objectionable, as the bees then consume the honey, and the comb is subject to displacement by the wrench received, and by its own gravity.

There is a thin piece of board, which is nearly as large as the inside of the sections, and lies loosely between any two of them, which is placed there to prevent the bees from passing from one section to the other. The object of this is to place the division-board between an empty section on the top of the hive and the next one below, thereby preventing the deposition of eggs in the top section, where honey in virgin comb is desired. Also, when the division-board has not been used until the hive is filled with honey, and it is desirable to rob by taking off the top section, the latter is simply raised, and the division-board put in its place. This will prevent the queen-bee from depositing any more eggs in the section which is to be robbed, and in the course of a few days whatever young bees may be in it will come out, and the vacant cells be filled with honey.

Having thus described our invention, what we claim as new is—

1. A bee-hive without honey-frames, having sections in vertical series, each section slatted at top and bottom, and the base slatted on top, as and for the purpose specified.

2. A bee-hive cover having the cup-ventilator D and close cap D′, as and for the purpose described.

THOMAS ROBINSON.
GEORGE W. ROBINSON.

Witnesses:
D. A. BOGGESS,
M. L. RIBLET.